United States Patent [19]

Haight et al.

[11] 3,784,759

[45] Jan. 8, 1974

[54] TELEPHONE SUBSTATION APPARATUS

[75] Inventors: William John Haight; John Edward Critchley, both of London, Ontario, Canada

[73] Assignee: Bell Canada-Northern Electric Research Limited, Ottawa, Ontario, Canada

[22] Filed: Apr. 17, 1972

[21] Appl. No.: 244,528

[52] U.S. Cl. .......... 179/84 VF
[51] Int. Cl. .......... H04m 1/50
[58] Field of Search .......... 179/84 VF, 84 R, 179/90 K

[56] References Cited

UNITED STATES PATENTS

| | | | |
|---|---|---|---|
| 3,274,345 | 9/1966 | Ham | 179/84 VF |
| 3,488,451 | 1/1970 | Nenninger | 179/80 K |
| 3,284,577 | 11/1966 | Burns | 179/84 VF |
| 3,064,084 | 11/1962 | Meacham | 179/84 VF |
| 3,184,554 | 5/1965 | Meacham | 179/84 VF |
| 3,060,275 | 10/1962 | Meacham | 179/84 VF |
| 2,951,911 | 9/1960 | Van Lottum | 179/84 VF |
| 3,008,009 | 11/1961 | Van Lottum | 179/84 VF |

*Primary Examiner*—Kathleen H. Claffy
*Assistant Examiner*—Alan Faber
*Attorney*—John E. Mowle

[57] ABSTRACT

A multifrequency signalling arrangement for a subscriber telephone set or other telephone substation circuit. In this arrangement a resonant circuit, comprising a pair of tapped inductors and associated capacitors, is energized with a direct current by connecting said resonant circuit in series with the voice transmitter unit after a selected digit button is actuated. Other contacts, linked to the digit buttons, subsequently enable an amplifier which forms part of the multifrequency oscillator, and still later interrupt the flow of direct current through the resonant circuit to initiate oscillations in said resonant circuit at the selected frequency.

8 Claims, 1 Drawing Figure

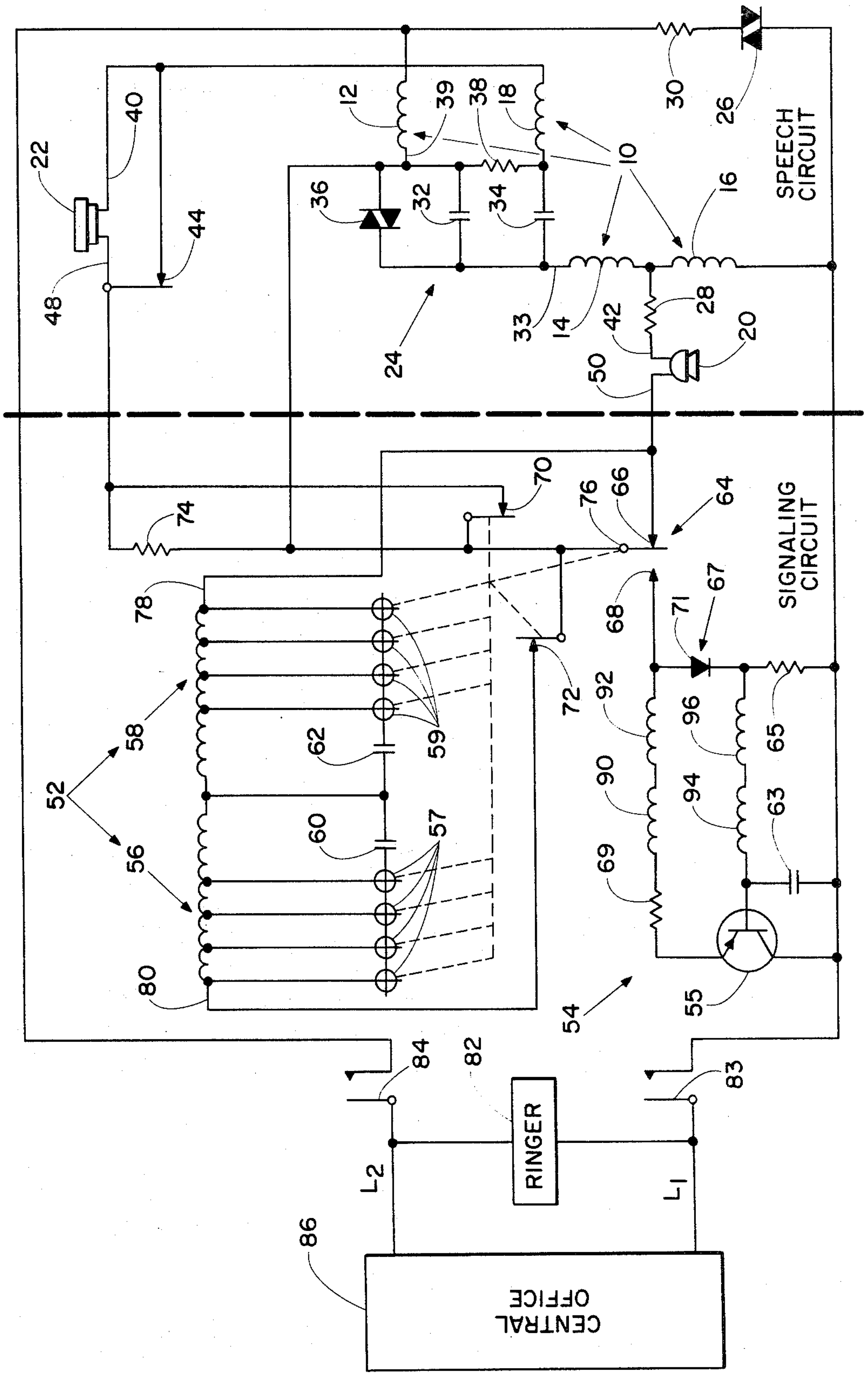
SPEECH CIRCUIT
SIGNALING CIRCUIT
RINGER
CENTRAL OFFICE

TELEPHONE SUBSTATION APPARATUS

FIELD OF THE INVENTION

This invention relates to telephone substation apparatus and more particularly to a multifrequency signalling arrangement for a subscriber telephone set or telephone substation circuit.

DESCRIPTION OF THE PRIOR ART

Many circuits are now available for generating the required combinations of audiofrequency tones which are now popularly used to signal a telephone central office in lieu of the traditional rotary dial.

Typical circuit arrangements are described in U. S. Pat. No. 3,184,554 issued to Larned A. Meacham on Sept. 8, 1958 and in U. S. Pat. Re 25,507 reissued to Larned A. Meacham on Jan. 7, 1964; and also in U. S. Pat. No. 3,284,577 granted to R.V. Burns and R.T. Cleary on Nov. 8, 1966. The relative advantages and disadvantages of the prior art circuits may be studied in detail by referring to the aforementioned patents.

Certain disadvantages of the prior art circuits still remain with respect to the effect of the signalling circuitry on the speech transmission capabilities of the telephone set and with respect to the design of the mechanical switches which enable the amplifier and interrupt the flow of direct current in the resonant circuit. In particular, with regard to speech transmission capabilities, it can be readily seen in aforementioned U. S. Pat. No. 3,184,554 that the particular varistor which is in series with the telephone line remains in series with the telephone line after the signalling function has been completed. This varistor decreases the sensitivity of the telephone substation apparatus or subscriber set so as to limit the maximum distance from the central office over which the telephone set can be located. Additionally, this varistor tends to degrade voice transmission.

The teachings of U. S. Pat. No. Re 25,507 overcome some of the limitations of the circuitry of earlier U. S. Pat No. 3,184,554 however, the resonant circuit remains in the speech circuit after signalling is completed and the design of the transfer switch remains somewhat critical. In particular changes in transition time between interruption of the current flow in the resonant or tank circuit and the application of bias to the transistor amplifier may lead to erractic oscillator operation. The design problems associated with the pushbutton dial or selector switches and their associated transfer switch which initiates oscillations in the resonant circuit are well described in U. S. Pat. No. 3,284,577 to R.V. Burns et al. To partially overcome the problems associated with the design of the selector switch and associated transfer switch, U. S. Pat. No. 3,284,577 to R.V. Burns et al describes an oscillator arrangement wherein the resonant circuit is excited at the instant that the amplifier is enabled. In the oscillator arrangement described in U. S. Pat. No. 3,284,577 unlike the other aforementioned arrangements, the capacitors associated with the resonant circuit begin to charge after the desired digit has been selected by depressing the associated digit button of the pushbutton dial. When the transfer switch has reached its make position the charged capacitors are connected across the selected portions of the coils which comprise the resonant circuit and the amplifier is simultaneously enabled.

Although the circuit described in aforementioned U. S. Pat. No. 3,284,577 overcomes certain disadvantages of the prior art, a disadvantage arising from the charging time constant for the resonant circuit capacitors remains. Referring now to the drawing of U. S. Pat. No. 3,284,577, this time constant is affected by diode 40 and resistor 38 which are connected in series with the resonant circuit across the telephone line so that the total resistance thereof may prevent the resonant circuit capacitors from acquiring sufficient charge during the interdigit intervals. If resistors 58 and 59 are used to bridge the selector contacts so that the resonant circuit passages can charge between digits and thereby increase the charge in the resonant circuit capacitors, a series circuit comprising the resonant circuit and the amplifier remains across the telephone line during voice transmission to affect the speech transmission characteristics of the subscriber telephone set.

SUMMARY OF THE INVENTION

It has been found that the problems associated with the prior art forms of multifrequency signalling arrangements may be overcome by arranging the resonant circuit such that direct current does not flow through the resonant circuit until a contact of the selector switch or pushbutton dial, has been actuated. In particular a pair of normally closed or break transfer contacts of a transfer switch, mechanically linked to the selector switch, are used to shunt the resonant circuit until one of the contacts of the selector switch has been actuated. When the break transfer contacts are opened the resonant circuit is automatically placed in series with the voice transmitter unit and the resulting current flow through the voice transmitter unit (usually a carbon microphone) energizes the resonant circuit. After a definite time interval, depending on the speed of operation of the transfer switch, the make transfer contact of the transfer switch closes to enable the amplifier circuit. After another interval in time a late-break contact, linked to the selector switch, opens to interrupt the flow of current passing through the resonant circuit. It can be seen that the energization of the resonant circuit begins before the amplifier circuit is enabled and is interrupted after the amplifier circuit is operational. In this manner, oscillations begun in the resonant circuit, are built up before the damped wave is dissipated to provide consistent operation which is not overly critical of the design of the selector switch and its associated transfer switch. Furthermore, once the signalling function has been completed, the input impedance as seen from the telephone line of a subscriber telephone set in accordance with the present invention, is as favourable as that of a standard telephone set equipped with a rotary dial.

Thus in accordance with the present invention the telephone signalling arrangement comprises a resonant circuit with a plurality of selectively controllable resonant frequencies. A selector means is provided for selecting a particular resonant frequency and an amplifying means is coupled to the resonant circuit to support oscillations at the selected resonant frequency. A switch means, responsive to operation of the selector means, maintains a shunt across the resonant circuit until the selector means is actuated. When the switch means operates to open this shunt circuit, direct current flows through the resonant circuit. The switch means later enables the amplifying means and still later interrupts the flow of direct current through the resonant circuit to initiate oscillations at the selected frequency.

BRIEF DESCRIPTION OF THE DRAWING

An example embodiment of the invention will now be described with reference to the accompanying circuit drawing of a telephone subscriber set in accordance with the present invention.

DESCRIPTION OF A PREFERRED EMBODIMENT

In the example embodiment, the circuitry comprises two distinct portions which are separated by a dashed vertical line. The portion to the right of this dashed line is the speech circuit and the portion to the left of this line is the signalling circuit. The speech circuit which is conventional in form includes: inductor 10 with first 12, second 14, third 16 and fourth 18 inductor windings, a voice transmitter unit 20, a voice receiver unit 22, a balancing network 24, a first varistor 26 and a first resistor 28 and a second resistor 30. The balancing network comprises a first 32 and a second 34 capacitor, a second varistor 36 and a third resistor 38. The first capacitor 32, the second varistor 36, and a series arrangement of the third resistor 38 with the second capacitor 34 are all connected in parallel to form the balancing network 24. The first inductor winding 12, the balancing network 24, the second inductor winding 14, and the third inductor winding 16 are serially connected to form a direct current series circuit across terminals $L_1L_2$ of the telephone line. The junction of the second varistor 36 with the first 32 and second 34 capacitors being connected to one end 33 of the second inductor winding 14, and the junction of the second varistor 36 with the first capacitor 32 and third resistor 38 being connected to one end 39 of the first inductor winding 12.

One terminal 40 of the voice receiver unit 22 being connected via the fourth inductor winding 18 to the junction of the second capacitor 34 and the third resistor 38. One terminal 42 of the voice transmitter unit 20 being connected via a first resistor 28 to the junction of the second 14 and third 16 inductor windings. The second resistor 30 and the first varistor 26 form a series circuit connected across line terminals $L_1$ and $L_2$. A normally closed set of contacts 44 linked to the usual telephone hook switch (not shown) shunt the voice receiver unit 22 until the telephone user has released the hook switch by going "off-hook." The other end 48 of the voice receiver unit 22, the junction of the second varistor 36 and the first inductor winding 12, and the other end 50 of the voice transmitter unit 20 are connected to the signalling portion of the telephone substation circuit in a manner which will be described later. With regards to the previous circuit description of the speech circuit, the various elements described and their interconnections are generally well known in the art and may be typically seen and described in further detail in aforementioned U. S. Pat. Re 25,507.

The signalling portion of the telephone substation circuit or subscriber telephone set includes a resonant circuit 52 coupled to an amplifier 54. As the structural make-up of the amplifier 54 and the resonant circuit 52 is well known and described in the art (e.g., aforementioned U. S. Pat. No. 3,284,577) only a minimal description is presented here.

The amplifier 54 includes a transistor 55, a capacitor 63, a pair of coils 90 and 92 in the emitter circuit of the transistor 55 and a further pair of coils 94 and 96 in the base circuit of the transistor 55. A fifth resistor 65, a diode 67, and a sixth resistor 69 establish the required operating bias voltages for the amplifier 54 when a suitable operating voltage is applied to the anode 71 of the diode 67.

The resonant circuit 52 includes a pair of tapped coils 56, 58 and a third and fourth capacitor 60, 62. Coils 56, 90 and 94 are closely coupled as are coils 58, 92 and 96 to transfer the oscillations generated in the resonant circuit 52 to the amplifier 54 in the well known manner. A selector switch (not shown) which is usually in the form of a number of digit buttons, is provided with a number of make contacts 57, 59 associated with the tapped coils 56, 58 of the resonant circuit 52 to connect the third 60 and fourth 62 capacitors to a selected portion of their corresponding coil to form two parallel resonant circuits in series in the well known manner. Linked to the selector switch are a number of other contact arrangements, particularly a transfer switch 64 having a break transfer contacts 66, and make transfer contacts 68. In addition an early-break set of contacts 70 and a late-break set of contacts 72 are also linked to the selector switch.

The early-break contacts 70 are arranged so as to shunt a fourth resistor 74 which is in series with the voice receiver 22. This fourth resistor 74 is connected to said other end 48 of the voice receiver 22 and to the common terminal 76 of the transfer switch 64. the break transfer contacts 66 of the transfer switch 64 are connected to said other terminal 50 of the voice transmitter 20 and to one end 78 of the resonant circuit 52. The other end 80 of the resonant circuit 52 is connected through late-break contacts 72 to the common terminal 76 of the transfer switch 64. The amplifier 54 is connected to one end ($L_1$) of the telephone line, and to the make transfer contacts 68 of the transfer switch 64.

In accordance with common practice a ringer 82 is connected across the telephone line $L_1L_2$ and a pair of make contacts 82, 84 of a hook switch (not shown) are used to disconnect the speech and multifrequency signalling circuits from the incoming lines $L_1$ and $L_2$. Incoming lines $L_1$ and $L_2$ which originate at the telephone central office 86 correspond to the "tip" and "ring" leads of standard telephone terminology.

OPERATION OF THE PREFERRED EMBODIMENT

After the phone is taken "off-hook," and prior to dialling (dialling here refers to a push-button or digit button form of multifrequency signalling), the hook switch make contacts 83, 84 close, and the normally closed contacts 44 of the hook switch, which shunt the voice receiver unit 22, open to render the voice receiver unit 22 operative. Before dialling, the contacts of the transfer switch 64 are in the positions shown in the drawing. Accordingly, a first direct current path is established from the central office 86 along $L_2$ through the first inductor winding 12, the balancing network 24, the second inductor winding 14, the third inductor winding 16, and back along $L_1$ to the central office 86. A second direct current path is established from the central office 86 along $L_2$ through the first inductor winding 12, the normally closed contacts or break-transfer contacts 66 of the transfer switch 64, the voice transmitter 20, the first resistor 28, the third inductor winding 16 and along $L_1$ back to the central office 86.

Additionally a further established direct current path includes the second resistor 30 and the first varistor 26.

Prior to dialling, the voice receiver unit 22 and the voice transmitter unit 20 are operative, the fourth resistor 74 is shunted by early break contacts 70 and no current passes through the resonant circuit 52 as break transfer contacts 66 short circuit the resonant circuit 52. Furthermore, the amplifier 54 is inoperative as it is disconnected from an operating voltage by the make transfer contacts 68 of the transfer switch 64. In the "off-hook" condition prior to dialling, therefore, this telephone set has an input impedance, as seen from the telephone line $L_1L_2$ which is substantially the same as that of a standard telephone set equipped with a rotary dial.

When multifrequency dialling is initiated by depressing one of the pushbuttons or digit buttons (not shown) of the selector selector switch, a pair of contacts 57, 59, one associated with each capacitor 60, 62 are initially closed in the well known manner to connect the third 60 and fourth 62 capacitors across a portion of their corresponding tapped coils 56, 58 which comprise the resonant circuit 52. The early-break contacts 70, which are mechanically linked to the digit buttons, next release to insert the fourth resistor 74 in series with the voice receiver unit 22 to attenuate the tone signals heard at the voice receiver unit to a comfortable user level. After a given time interval the transfer switch 64, which is also mechanically linked to the digit buttons, opens the break transfer contacts 66 to insert the resonant circuit 52 in series with the voice transmitter unit 20 so as to form part of the second direct current path.

This second direct current path is established across the telephone lines via first inductor winding 12, resonant circuit 52, late-break contact 72, voice transmitter unit 20, first resistor 28 and the third inductor winding 16. Shortly thereafter, the make transfer contacts 68 close and apply an operating voltage to the amplifier 54 from the junction of the first inductor winding 12 and the second varistor 36. After the amplifier 54 has been enabled by closure of the make transfer contacts 68, late-break contacts 72 separate to interrupt the flow of direct current through the resonant circuit 52. The late-break contacts 72, the early-break contacts 70, the make 68 and break 66 transfer contacts, and the contacts associated with the resonant circuit 52 are mechanically linked to the digit buttons as shown by the dashed lines in the drawing.

Because of the particular operating sequence, in which the energization of the resonant circuit 52 is begun before the amplifier 54 is enabled and is interrupted after the amplifier 54 has been enabled, reliable multifrequency signalling is assured.

What is claimed is:

1. A telephone substation circuit of the central battery type having a pair of terminals, and a speech of the anti-sidetone type establishing a direct current path across said terminals, said speech circuit including a voice transmitter unit and a voice receiver unit, said substation circuit further comprising:

*a.* a multifrequency generator having a resonant circuit with discretely controllable resonant frequencies and an amplifying means;

*b.* selector means for selecting a descrete resonant frequency of the resonant circuit, the resonant circuit being coupled to the amplifying means in such manner as to render the amplifying means capable of supporting oscillations at said selected frequency;

*c.* switch means, linked to said selector means, for shunting the resonant circuit until actuation of said switch means by operation of said selector means, for removing the shunt so as to place the resonant circuit in series with the voice transmitter unit, said switch means functioning also to enable the amplifying means by connecting the amplifying means to the speech circuit so as to derive an operating voltage therefrom, and to interrupt the flow of direct current through the resonant circuit after said amplifying means has been enabled;

whereby the output of said multifrequency generator is coupled to said pair of terminals.

2. The invention as claimed in claim 1 wherein the switch means is mechanically linked to the selector means to be responsive thereto, and wherein the switch means comprises a set of transfer contacts and a late-break set of contacts, the transfer contacts being used to shunt the resonant circuit and to enable the amplifying means, and the late-break contacts being used to interrupt the flow of direct current through the resonant circuit so as to initiate oscillations at said selected frequency after said amplifying means has been enabled.

3. The invention as claimed in claim 2 wherein the break transfer contact being for shunting the resonant circuit and the make transfer contact being for completing a circuit to enable the amplifying means.

4. A telephone substation circuit of the central battery type including a pair of terminals, an induction coil having a plurality of windings, a line impedance balancing network, a voice receiver unit, and a voice transmitter unit, the voice transmitter unit being serially connected with a winding of the induction coil to form part of a series circuit establishing a direct current path across said terminals, said substation circuit further comprising:

*a.* a multifrequency generator having a resonant circuit with discretely controllable resonant frequencies, a selector means for selecting a discrete resonant frequency and an amplifying means, said resonant circuit being coupled to said amplifying means in such manner as to render said amplifying means capable of supporting oscillation at said selected frequency,

*b.* switch means normally shorting said resonant circuit, said switch means responding to operation of said selector means by removing said short, by inserting the resonant circuit in series with the voice transmitter unit to initiate a flow of direct current through the resonant circuit, by enabling said amplifying means with current derived from a voltage appearing across a series circuit including, said resonant circuit, the voice transmitter unit, and said winding of the induction coil, and by interrupting the flow of direct current through the resonant circuit after said amplifying means has been enabled,

*c.* whereby the output of said multifrequency generator is coupled to said pair of terminals.

5. The invention as defined in claim 4 wherein the resonant circuit comprises an inductor with a plurality of tap positions and a capacitor for connection to a selected one of said tap positions by the selector means, and wherein the switch means is mechanically linked to the selector means so as to operate with each operation of the selector means, the switch means having a set of transfer contacts and a late-break set of contacts whereby the transfer short the resonant circuit in their unoperated position and allow an operating voltage to enable the amplifying means in their operated position and whereby the late-break pair of contacts interrupt the flow of direct current through the resonant circuit after said amplifying means has been enabled.

6. In a telephone substation circuit having a speech network including a voice transmitter and a voice receiver;

a substation signalling circuit comprising:

a resonant circuit having a plurality of selectively controllable resonant frequencies, a shunt in parallel with said resonant circuit for bypassing current around said circuit, the combination of said resonant circuit and said shunt being in series with at least a portion of said speech network;

selector means for selecting a resonant frequency of the resonant circuit;

amplifying means coupled to the resonant circuit for supporting oscillations at said selected resonant frequency; and switch means, responsive to said selector means, for opening the shunt across the resonant circuit upon actuation of the selector means, to allow a direct current to flow through the resonant circuit, said switch means being operative thereafter to enable the amplifying means and to interrupt said flow of direct current after the amplifying means has been enabled.

7. The invention as claimed in claim 6 wherein the switch means is mechanically linked to the selector means to be responsive thereto, and wherein the switch means comprises a set of transfer contacts and a late-break set of contacts, the transfer contacts being for shunting the resonant circuit and to enable the amplifying means, and the late-break contacts being for interrupting the flow of direct current through the resonant circuit so as to initiate oscillations at said selected frequency after said amplifying means has been enabled.

8. The invention as claimed in claim 7 wherein the break transfer contact being for shunting the resonant circuit and the make transfer contact being for completing a circuit to enable the amplifying means.

* * * * *